G. A. GASE.
SHEET METAL WHEEL.
APPLICATION FILED SEPT. 30, 1918.
1,384,128.
Patented July 12, 1921.
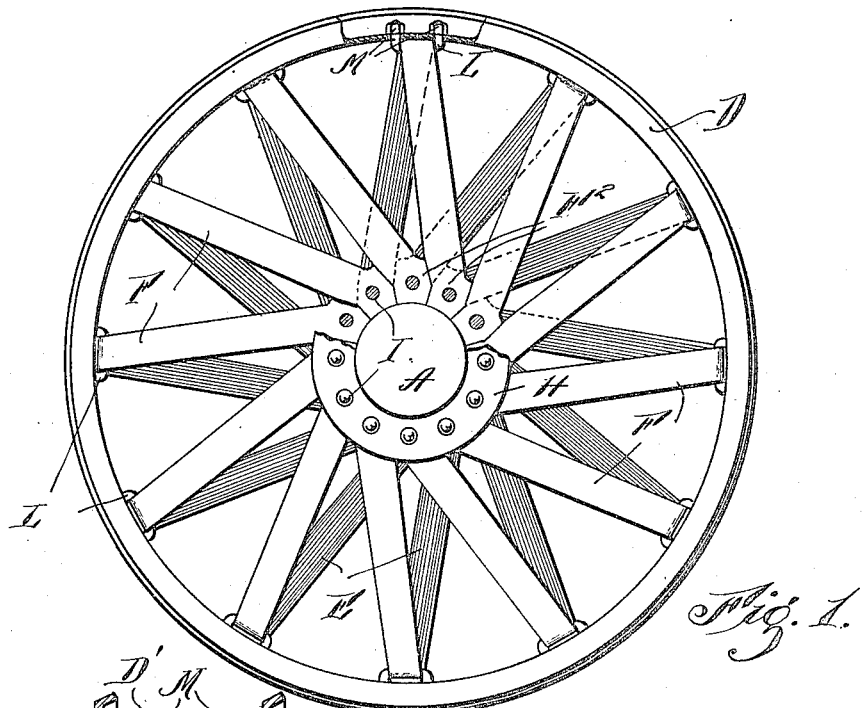
Fig. 1.
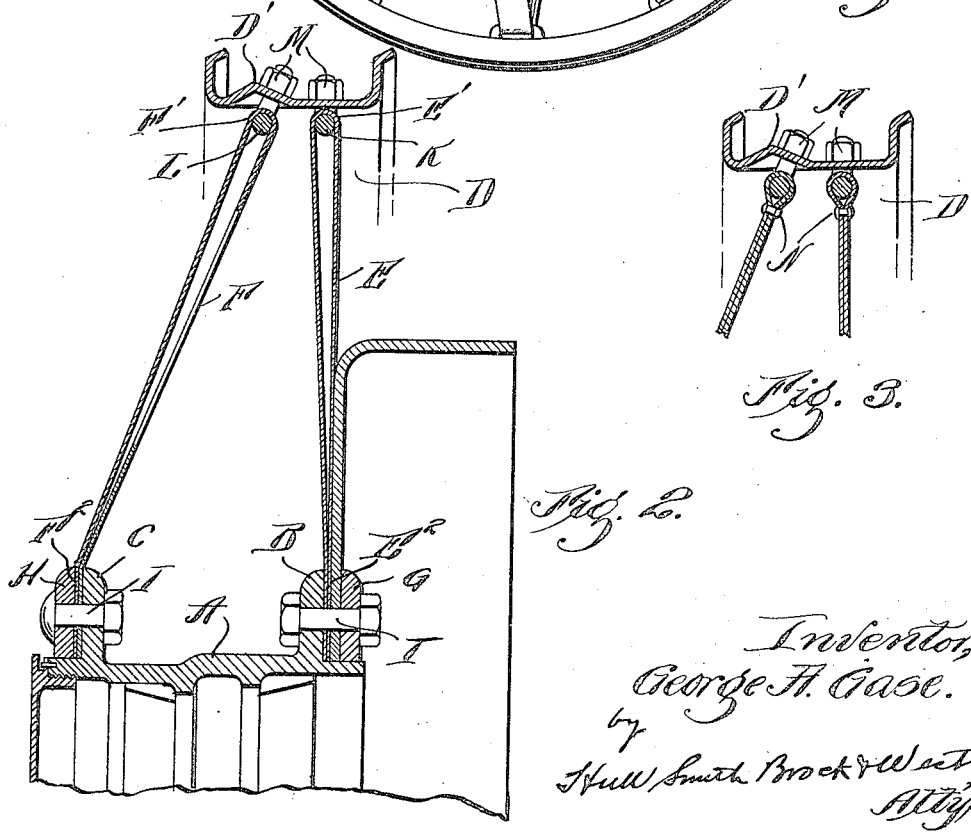
Fig. 3.
Fig. 2.
Inventor,
George A. Gase.
by
Hull Smith Brock & West
Attys

UNITED STATES PATENT OFFICE.

GEORGE A. GASE, OF CLEVELAND, OHIO, ASSIGNOR TO THE HYDRAULIC PRESSED STEEL COMPANY, OF CLEVELAND, OHIO, A CORPORATION OF OHIO.

SHEET-METAL WHEEL.

1,384,128.  Specification of Letters Patent.  Patented July 12, 1921.

Application filed September 30, 1918. Serial No. 256,180.

*To all whom it may concern:*

Be it known that I, GEORGE A. GASE, a citizen of the United States, residing at Cleveland, in the county of Cuyahoga and State of Ohio, have invented a certain new and useful Improvement in Sheet-Metal Wheels, of which the following is a full, clear, and exact description, reference being had to the accompanying drawings.

This invention relates generally to wheels, and more particularly to a sheet metal wheel comprising a hub, a sheet metal felly and a plurality of sheet metal spokes, each secured to the hub at its inner end and adjustably connected to the felly at its outer end; the object being to provide an exceedingly strong and durable tensioned wheel in which each spoke can be subjected separately to the proper tensioning action.

Another object of the invention is to construct a sheet metal wheel having the spokes arranged in two series, namely, the inner and outer series, said spokes being spread sufficiently at the hub to give the wheel the proper strength to withstand lateral strains.

With these, and certain other objects in view which will become apparent as the description proceeds, the invention consists in the novel features of construction, and the manner of combining or arranging the various parts, all of which will be described fully hereinafter and set forth in the appended claims.

In the drawings forming a part of this specification Figure 1 is a front elevation partly in section of a wheel embodying one form of my invention; Fig. 2 is a detail transverse sectional view of a rear wheel embodying the invention; and Fig. 3 is a detail sectional view showing a slight modification.

In the practical embodiment of my invention, I employ a metal hub, A, which, so far as its interior construction is concerned, may be of any desired type. Upon the exterior, the hub is provided with a flange B adjacent to the inner end, and a flange C adjacent to the outer end.

The felly D is rolled from sheet metal and is preferably shaped to receive a tire carrying rim. The base of this felly, instead of being flat throughout its entire circumference, is upset at definite intervals at an angle oblique to the plane of the wheel as shown at D', these upset portions being preferably arranged adjacent the outer edge of the felly base for a purpose hereinafter explained.

The spokes E and F are each formed from a single strip of sheet metal bent centrally upon itself at E' and F', respectively, while the ends $E^2$ and $F^2$ are fastened to the hub flanges B and C by the inner and outer hub rings G and H, respectively, and the bolts I, which pass through such flanges and the spoke ends.

These spoke ends are are angled and tapered as shown most clearly in Fig. 1 and in practice it is preferred to attach one end of the spoke to the hub flange at one point and the other end of the spoke to the same hub flange at a point circumferentially advanced, there being an intervening space sufficient to receive the end of the next adjacent spoke. Each spoke end overlaps another spoke end or is overlapped by one so that there are two thicknesses of metal between the hub flanges and rings.

The looped ends of the spokes, which are the outer ends, are connected to the felly by means of staples or clips, the spokes E being secured by the clips K, and the spokes F by the clips L, the outer ends of the staples or clips being threaded and projected through the base of the felly and having nuts M screwed thereon in order to provide the proper pull and effect in tensioning of the spokes, and inasmuch as the spokes F are considerably inclined, the nuts M connected with the links or staples seat or bear upon the inclined offset portions D' of the felly thus positioning the clip or staple in a direct line with the spoke so that the pull on all of the parts is in a perfectly straight line.

The spokes E have some inclination, and the base of the felly can be given a slight inclination to properly position the clip and nut employed for securing the inner series of spokes.

By means of this construction it is obvious that each and every spoke can be individually tensioned and that all of the strain will be communicated in a perfectly straight line thus insuring the minimum amount of wear and maintaining the proper adjustment for the maximum length of time.

By arranging the series of the spokes at an angle to each other and providing the proper spread at the hub, a wheel will be provided having the maximum strength to resist lateral strains, and by fastening one end of the spoke to the hub and the other end to a point circumferentially advanced, a wheel will be provided in which the circumferential or tractional strains will be more evenly distributed.

If desired additional tensioning can be imparted to the spokes by drawing the strips together and riveting them as shown at N in Fig. 3.

A sheet metal wheel constructed as herein shown and described will be extremely light and at the same time strong and durable and it is obvious that each and every spoke can be given the proper initial tension, and furthermore can be quickly and easily retensioned from time to time if required.

In case one or more spokes should become broken or impaired they can be quickly and easily removed and others substituted in their place.

Any suitable type of hub-cap can be employed and a brake-drum can be attached to the rear wheel at the same time the inner series of the spokes is being connected.

Having thus described my invention, what I claim is:—

1. A wheel comprising a felly a hub, having front and rear flanges, a series of spokes fastened to the front flange, a series of spokes fastened to the rear flange, each spoke having its ends fastened to its respective flange, the intermediate portion of each spoke being connected to the felly.

2. A wheel comprising a hub having inner and outer flanges, a felly, an inner series of spokes, and an outer series of spokes, the inner ends of the inner spokes being connected to the inner flange and the inner ends of the outer spokes being connected to the outer flange, the intermediate portions of both the inner and the outer spokes being connected to the felly.

3. A wheel comprising a felly, a hub having front and rear flanges, a series of front spokes, a series of rear spokes, each spoke composed of a strip of metal folded centrally upon itself, the inner ends of the front spokes being connected to the front flange, the inner end of rear spokes being connected to the rear flange, and clips for connecting the intermediate portions of the spoke to the felly.

4. A wheel comprising a felly, a hub having radial flanges, and a plurality of spokes, each spoke consisting of a strip of sheet metal bent upon itself, the inner ends of each spoke being connected to a hub flange, the intermediate portion of each spoke being connected to the felly, a clip for connecting said spoke end to the felly, said felly being shaped to provide a bearing portion whereby the clip will be held to exert a direct pull upon the spoke.

5. A wheel comprising a felly, a hub having radial flanges, and sheet metal spokes rigidly connected at their inner ends to the hub flanges, the intermediate portions of said spokes being connected with the felly, means for connecting said spoke portions and felly, said means being adjustable to exert radial tension upon each spoke.

6. A wheel comprising a felly, a hub having radial flanges, and a plurality of sheet metal spokes arranged in two series, the inner series being connected to the inner hub flange and the outer series to the outer hub flange, clips for connecting the outer ends of the spokes to the felly, the base of said felly being so shaped as to hold each of said clips in a direct line with the spoke to which it is connected.

7. A sheet metal wheel comprising a felly, a hub having flanges, and a plurality of spokes, said spokes being arranged in two series, the inner series being connected to the inner hub flange and the outer series to the outer hub flange, each spoke consisting of a strip of sheet metal bent centrally upon itself, clips for connecting the intermediate portions of said spokes to the felly, one end of each spoke being connected to its respective hub flange and the other end of said spoke being connected to the same hub flange at a point circumferentially spaced from the first mentioned end.

In testimony whereof, I hereunto affix my signature.

GEORGE A. GASE.